United States Patent [19]
Unoura

[11] Patent Number: 5,517,412
[45] Date of Patent: May 14, 1996

[54] SELF-NAVIGATING VEHICLE EQUIPPED WITH LANE BOUNDARY RECOGNITION SYSTEM

[75] Inventor: Kiyozumi Unoura, Saitama, Japan

[73] Assignee: Honda Giken Kogyo Kabushiki Kaisha, Tokyo, Japan

[21] Appl. No.: 307,367

[22] Filed: Sep. 16, 1994

[30] Foreign Application Priority Data

Sep. 17, 1993 [JP] Japan .................. 5-254895

[51] Int. Cl.⁶ .................................. G06F 165/00
[52] U.S. Cl. .................. 364/424.02; 364/460; 364/461; 348/118
[58] Field of Search ............... 364/424.02, 460, 364/461, 449; 180/167, 168, 169; 318/587; 348/113, 116, 118, 135, 139; 340/435, 903

[56] References Cited

U.S. PATENT DOCUMENTS

| | | | |
|---|---|---|---|
| 4,970,653 | 11/1990 | Kenue ......................... | 364/461 |
| 5,301,115 | 4/1994 | Nouso ......................... | 364/424.02 |
| 5,309,137 | 5/1994 | Kajiwara ...................... | 340/903 |
| 5,318,143 | 6/1994 | Parker et al. .................. | 364/424.02 |
| 5,341,437 | 8/1994 | Nakayama ..................... | 348/118 |
| 5,351,044 | 9/1994 | Mathur et al. .................. | 340/903 |

FOREIGN PATENT DOCUMENTS

| | | |
|---|---|---|
| 62-139011 | 6/1987 | Japan . |
| 3-158976 | 7/1991 | Japan . |

*Primary Examiner*—Gary Chin
*Attorney, Agent, or Firm*—Lyon & Lyon

[57] ABSTRACT

A lane boundary recognition system for a self-navigating vehicle which enables the vehicle to self-navigate on an expressway or other such roadway having lane boundaries while simultaneously identifying and discriminating the continuity of the lane boundaries. Vehicle position to the lane boundaries are determined at times T0 and T1. A vehicle locus occurred in a period between the times is estimated and the position at the time T0 is corrected. A difference between said corrected position and said position at the time T1 is calculated and is adding to lane boundary numbers and by comparing them with each other, it is determining if the lane boundaries recognized at the times T0 and T1 are continuous. If determined to be continuous, the same number is assigned and is stored in a common memory.

9 Claims, 10 Drawing Sheets

Figure 10:
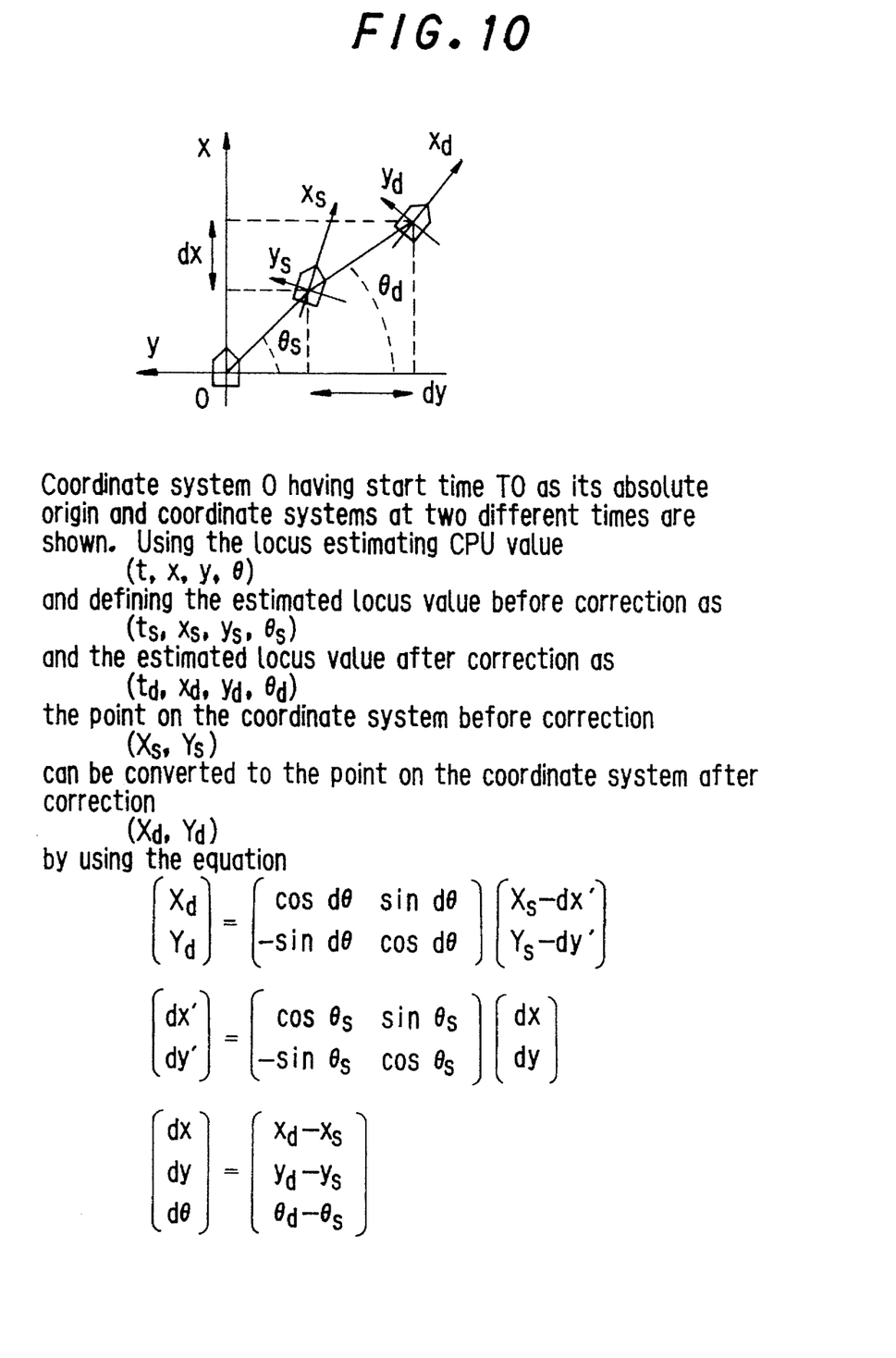
FIG. 10 is diagram for explaining the procedure in the flowchart of FIG. 6 for correcting the vehicle position based on the vehicle locus.

Coordinate system O having start time TO as its absolute origin and coordinate systems at two different times are shown. Using the locus estimating CPU value
$$(t, x, y, \theta)$$
and defining the estimated locus value before correction as
$$(t_s, x_s, y_s, \theta_s)$$
and the estimated locus value after correction as
$$(t_d, x_d, y_d, \theta_d)$$
the point on the coordinate system before correction
$$(X_s, Y_s)$$
can be converted to the point on the coordinate system after correction
$$(X_d, Y_d)$$
by using the equation $$\begin{pmatrix} X_d \\ Y_d \end{pmatrix} = \begin{pmatrix} \cos d\theta & \sin d\theta \\ -\sin d\theta & \cos d\theta \end{pmatrix} \begin{pmatrix} X_s - dx' \\ Y_s - dy' \end{pmatrix}$$

$$\begin{pmatrix} dx' \\ dy' \end{pmatrix} = \begin{pmatrix} \cos \theta_s & \sin \theta_s \\ -\sin \theta_s & \cos \theta_s \end{pmatrix} \begin{pmatrix} dx \\ dy \end{pmatrix}$$

$$\begin{pmatrix} dx \\ dy \\ d\theta \end{pmatrix} = \begin{pmatrix} x_d - x_s \\ y_d - y_s \\ \theta_d - \theta_s \end{pmatrix}$$

FIG. 11

SELF-NAVIGATING VEHICLE EQUIPPED WITH LANE BOUNDARY RECOGNITION SYSTEM

BACKGROUND OF THE INVENTION

1. Field of the Invention

This invention relates to a lane boundary recognition system for a self-navigating vehicle, and particularly to such a system as is able for the vehicle to self-navigate on an expressway or other such roadway having lane boundaries while simultaneously identifying and discriminating the continuity of the lane boundaries (lane dividing markers and road boundary markers).

2. Description of the Prior Art

Various vehicle self-guidance technologies involving lane boundary recognition have been proposed. For example, in Japanese Laid-open Patent Publication No. Hei 3-158,976 the assignee discloses a method for recognizing road lane boundaries by discriminating broken lines from among straight line components extracted from an image of the road. On the other hand, Japanese Laid-open Patent Publication No. Sho 62-139,011 teaches a method for deriving loci approximating actual lane boundaries from lines obtained by conducting projective transformation and functionally approximating points indicating lane boundaries selected from an image.

These prior art technologies have a problem in that they do not provide information regarding the continuity of the lane boundaries recognized at a given instant with those recognized earlier. When steering control or the like is to be conducted, therefore, it is necessary to discriminate the continuity of the lane boundaries instant by instant. Moreover, where separate blocks are used for steering control and for recognition of lane boundaries through image processing, the discrimination has to be conducted separately in each block. In addition, the prior art technologies require a particularly large volume of computation at the time the vehicle changes lanes because the change in the positional relationship between the vehicle and the lane boundaries caused by the lane change makes it necessary to carry out another discrimination of the continuity of the lane boundaries following the change. A similar situation also arises when a separate block is provided for recognizing obstacles through the use of radar or the like.

SUMMARY OF THE INVENTION

One object of this invention is therefore to overcome the aforesaid drawbacks of the prior art by providing a lane recognition system for a self-navigating vehicle wherein lane boundaries can be readily identified and computation volume reduced by discriminating the continuity of lane boundaries and consistently assigning the same identifier to the same boundary.

Another object of this invention is to provide a lane boundary recognition system for a self-navigating vehicle wherein even when separate blocks are used for steering control or the like and for recognition of lane boundaries through image processing the trouble of separately determining lane boundary continuity in each block can be avoided and the computation volume be reduced by having the blocks jointly utilize specific lane boundary information.

For realizing these objects, the present invention provides a system for recognizing lane boundary for a self-navigating vehicle, comprising first means for capturing a view of a lane of a roadway on which said vehicle travels to obtain an image of said lane, second means for extracting at least a line segment from said image, third means for recognizing said lane at a first time T0 and at a second time T1 based on said line segment, fourth means for estimating a locus of said vehicle occurred in a period between said times T0 and T1, fifth means for determining as to whether or not said lane recognized at said first time T0 and that recognized at said second time T1 are continuous based on said lane recognized at said second time T1 and said estimated locus of said vehicle and for assigning a same lane identifier when said lane recognized at said first time T0 and that recognized at said second time T1 are determined to be continuous, and sixth means for storing information regarding said lane identifier relative to said lane.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Figure 1:
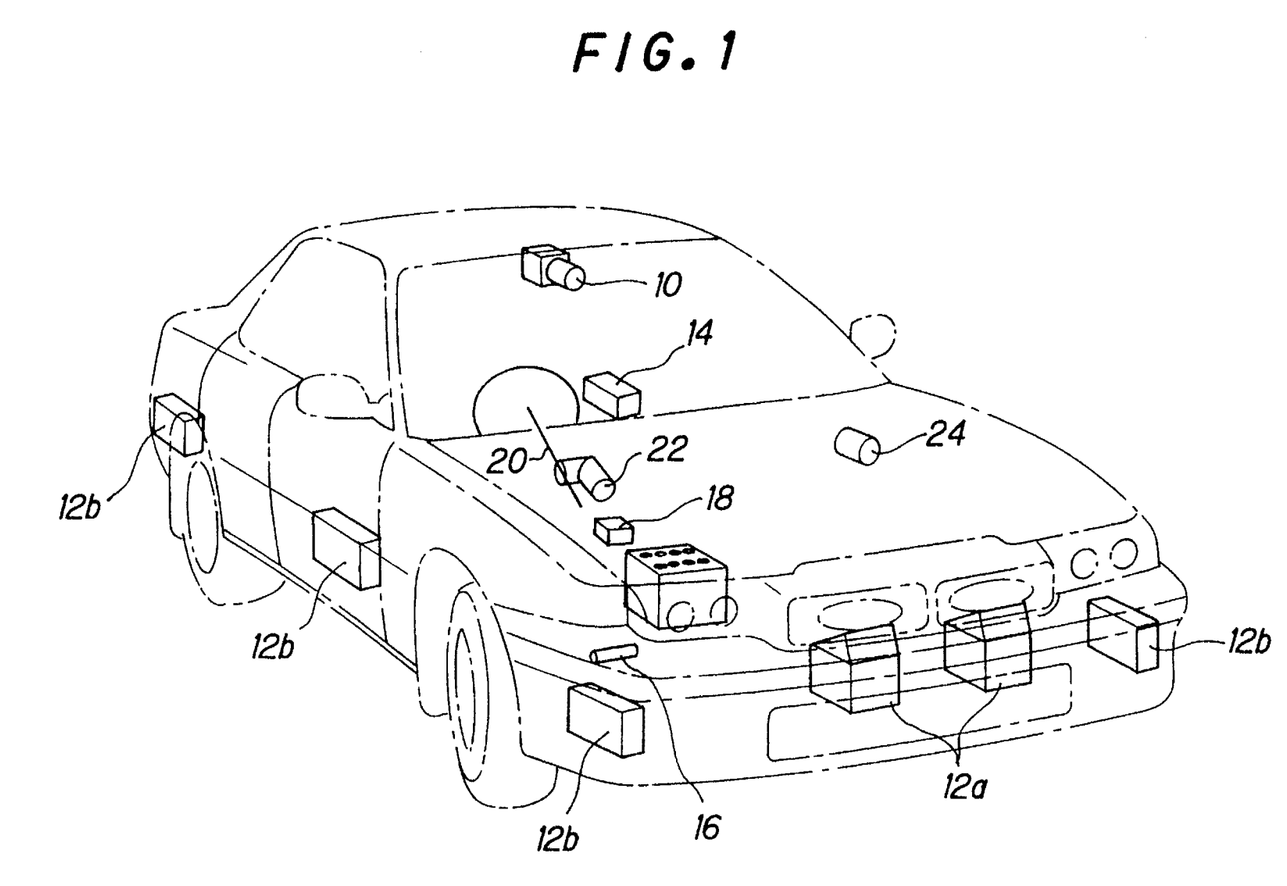
FIG. 1 is an overall perspective view of a self-navigating vehicle with a lane boundary recognition system according to the invention.

As shown in the perspective overview of FIG. 1, the self-navigating vehicle with the lane boundary recognition system according to this invention is equipped with a CCD (charge-coupled device) camera 10 mounted above the driver's seat in the vicinity of the rearview mirror to capture a monocular view of the road ahead. The vehicle is further equipped with a radar system 12 comprising of 10 radars with millimeter waves (two front radars 12a mounted at the front of the vehicle, six side radars 12b mounted three at either side of the vehicle (two of which are not shown) and two rear radars (not shown) mounted at the rear of the vehicle). The radar system 12 detects the presence of nearby vehicles and other solid objects from the millimeter waves they reflect.

A yaw rate sensor 14 is mounted near the center of the passenger compartment for detecting the angular acceleration of the vehicle around a vertical axis (z axis), a vehicle speed sensor 16 constituted as a reed switch is mounted in the vicinity of the vehicle drive shaft (not shown) for detecting the vehicle travel speed, and a steering angle sensor 18 is provided in the vicinity of the steering shaft 20 for detecting the steering angle.

The steering shaft 20 is equipped with a steering angle control motor 22, the throttle valve (not shown) is equipped with a throttle actuator 24 constituted as a stepping motor, and the brake system (not shown) is equipped with a brake pressure actuator 26 (not shown in FIG. 1). With this configuration, the vehicle navigates automatically by controlling the steering angle in accordance with a calculated steering angle manipulated variable, adjusting the vehicle speed by controlling the throttle valve opening, and, when necessary, applying the brakes.

Figure 2:
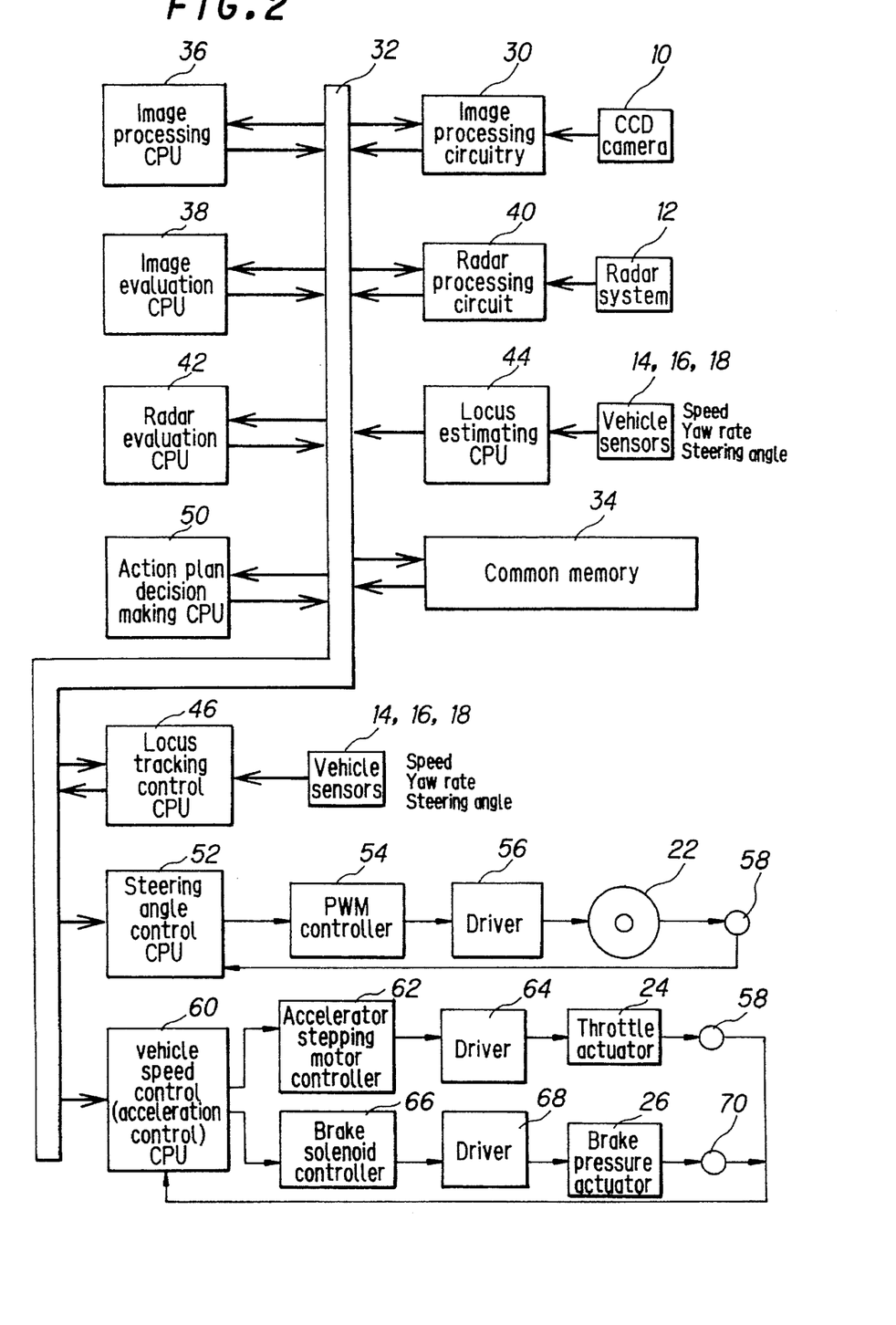
FIG. 2 is a block diagram showing particulars regarding the sensors of FIG. 1 and the processing of the sensor outputs.

The aforesaid configuration is shown in detail in the block diagram of FIG. 2. The output of the CCD camera 10 is sent to image processing circuitry 30 for the required processing and the result is stored in a common memory 34. An image processing CPU 36 and an image evaluation CPU 38 read the stored values at prescribed times for detecting the road ahead. The output of the radar system 12 is sent through a radar processing circuit 40 and a dedicated bus 32 to be stored in the common memory 34. A radar evaluation CPU 42 reads the stored values at prescribed times for detecting the position of obstacles within a coordinate system.

The outputs from the vehicle speed sensor 16 etc. are sent to a locus estimating CPU 44 for estimating the vehicle locus. An action plan decision making CPU 50 produces a desired course based on the stored values. The desired course and the estimated vehicle locus are sent to a locus tracking control CPU 46 which decides a locus (desired course) tracking manipulated variable. In addition, the locus tracking control CPU 46 calculates the steering angle manipulated variable and forwards it to a steering angle control CPU 52 which drives the steering angle control motor 22 through a PWM (pulse width modulation) controller 54 and a driver 56. The amount by which the motor is driven is detected by an encoder 58 and used for feedback control.

A speed/tracking control section of the action plan decision making CPU 50 calculates a desired car body acceleration and forwards it to a vehicle speed control CPU 60. The vehicle speed control CPU 60 drives the throttle actuator 24 through an accelerator stepping motor controller 62 and a driver 64 and drives the brake pressure actuator 26 through a brake solenoid controller 66 and a driver 68. The amount by which the brake pressure actuator 26 is driven is detected by a pressure sensor 70 and used for secondary feedback control. Although omitted from the drawings in the interest of simplicity, the configuration also includes waveform shaping circuits and other sensor output processing circuits.

Figure 3:
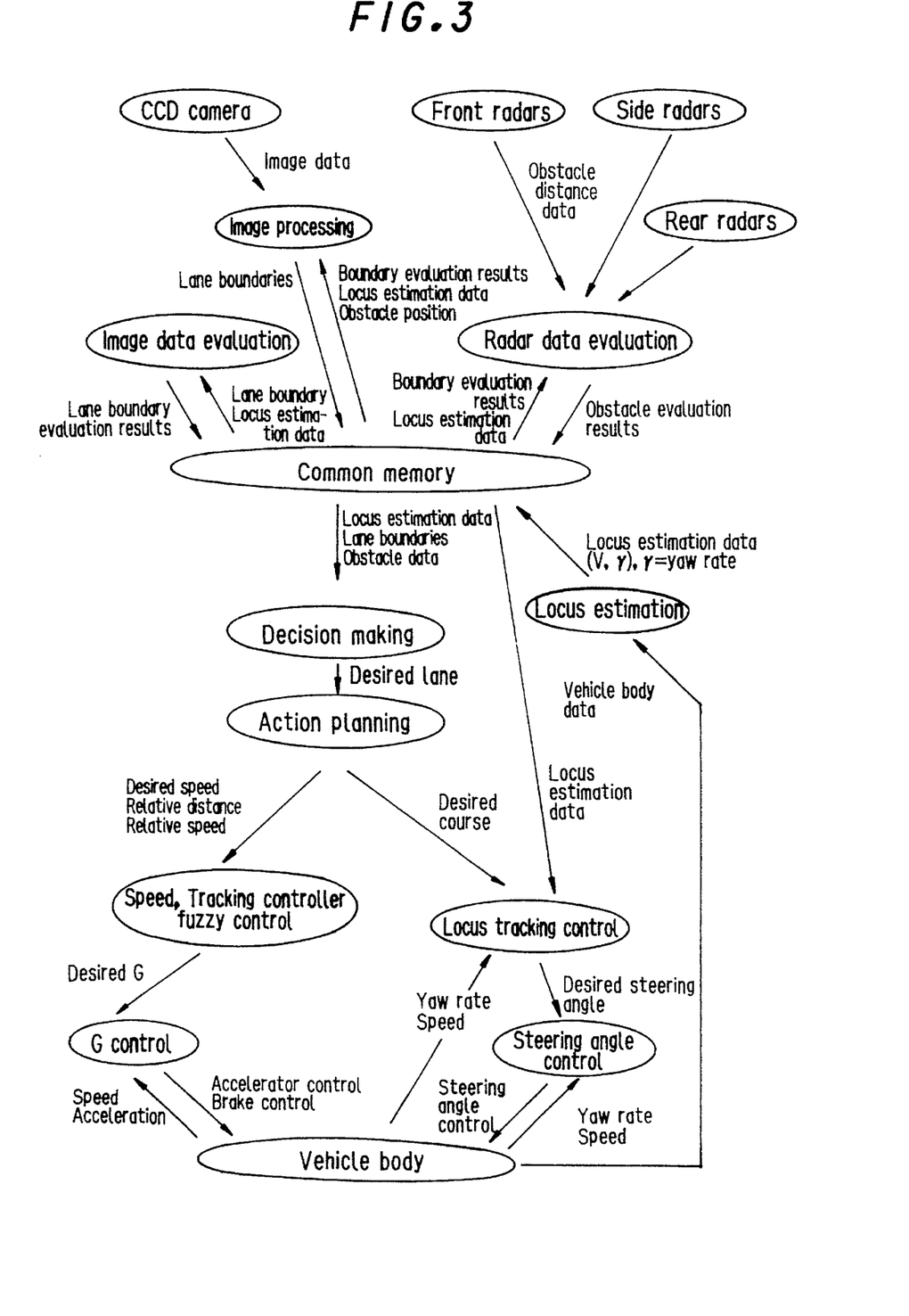
FIG. 3 is a block diagram similar to that of FIG. 2 for explaining the configuration of FIG. 2 more in terms of function.

The diagram of FIG. 3 shows the functions of the block diagram of FIG. 2. The invention relates to the part of FIG. 3 concerning image evaluation. Specifically, the continuity of the lane boundaries is discriminated by image evaluation and each lane boundary is consistently assigned the same identifier (number).

Figure 4:
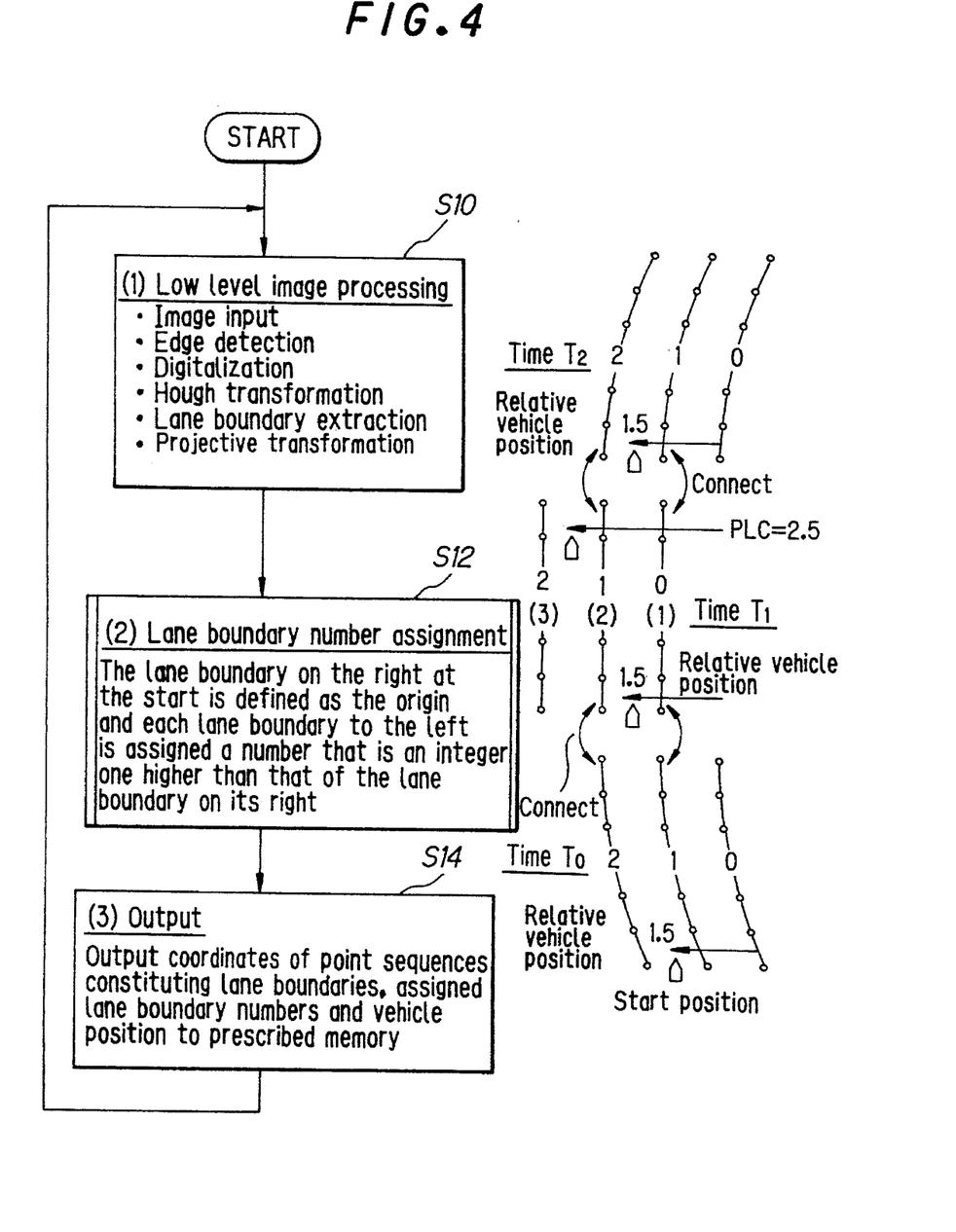
FIG. 4 is a flowchart showing the operations of the self-navigating vehicle with a lane boundary recognition system according to the invention conducted by the image evaluation CPU of the block diagram of FIG. 2.

The invention will now be described with respect to the flowchart (problem analysis diagram or structural flowchart) of FIG. 4. The flowchart of FIG. 4 shows the operations conducted by the image evaluation CPU 38, which are repeated once every prescribed time interval Tn. The explanation starts from time T0.

Figure 5:
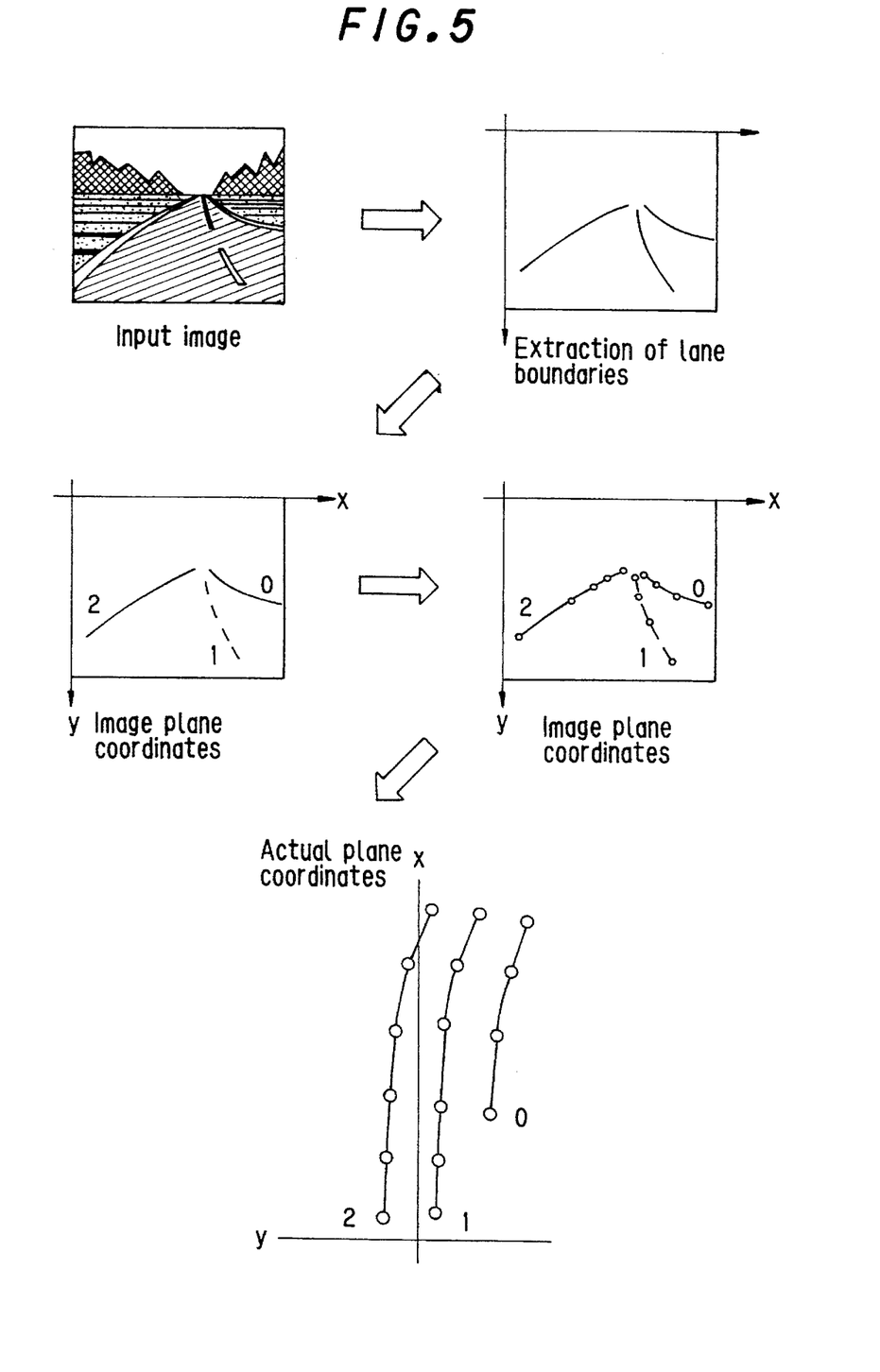
FIG. 5 is a diagram for explaining the image processing according to the flowchart of FIG. 4.

First, low level image processing is conducted in a step S10. Specifically, the image is input, its edges are detected, digitization is conducted, lane boundary segments are extracted by a Hough transformation, and projective transformation is conducted to obtain point sequence sets constituting lane boundaries in a plane coordinate system having the vehicle as the origin. This processing is illustrated in FIG. 5. As shown in this figure, the lane boundaries are indicated as point sequence coordinates. As also shown, the x axis of the coordinate system lies in the direction of vehicle travel, the y axis lies perpendicular to the x axis, and the sign of each axis is positive in the direction of its arrow. In the case of the y axis, for example, left is plus and right minus.

The program proceeds to a step S12 in which lane boundary numbers are assigned.

Figure 6:
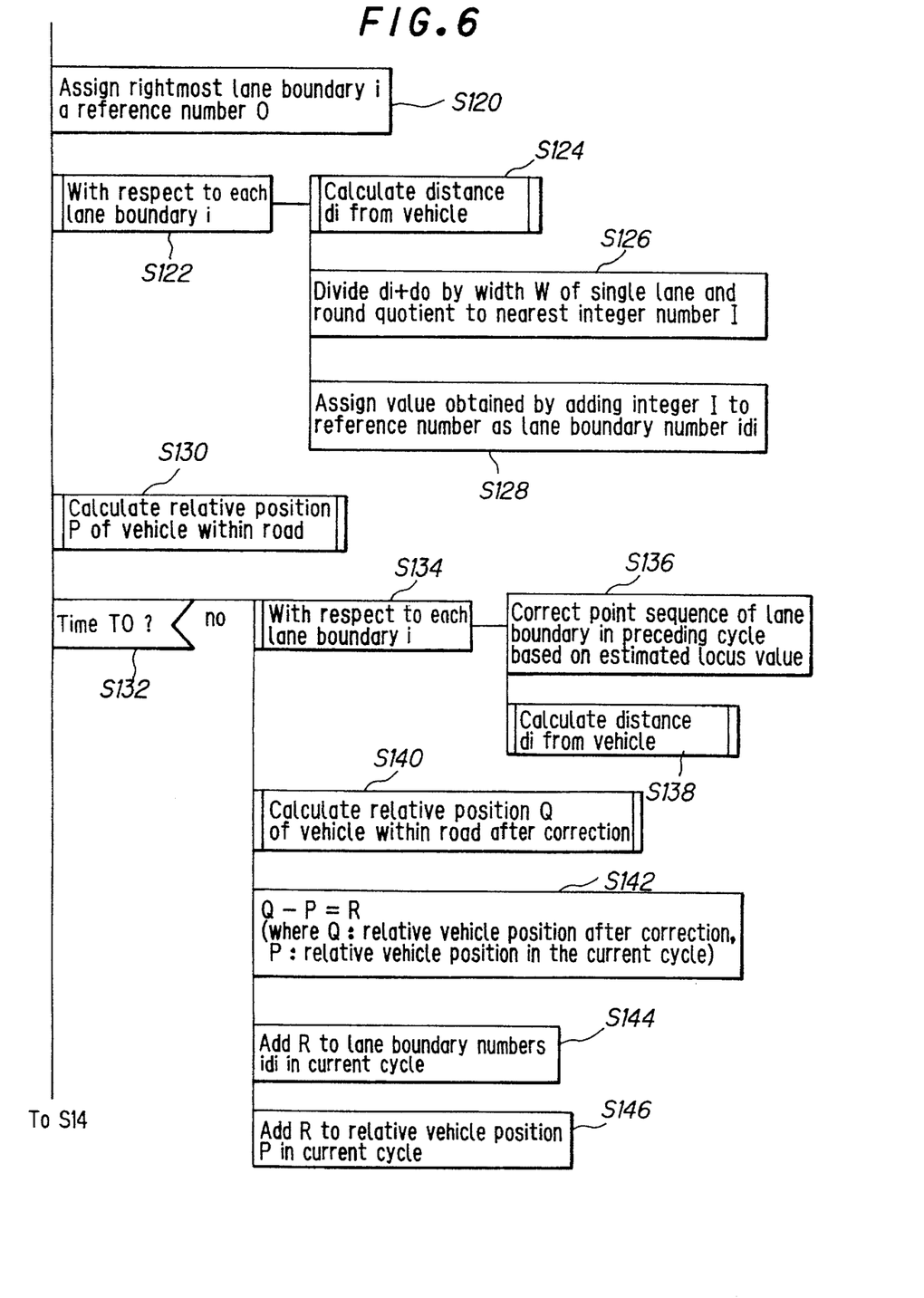
FIG. 6 is a flowchart of a subroutine of the flowchart of FIG. 4 for assigning lane boundary numbers.

The subroutine for lane boundary number assignment is shown in FIG. 6. In a step S120 the lane boundary farthest to the right is assigned a reference number (zero). This is shown concretely in FIG. 4, in which the rightmost lane boundary is labeled 0.

Figure 8:
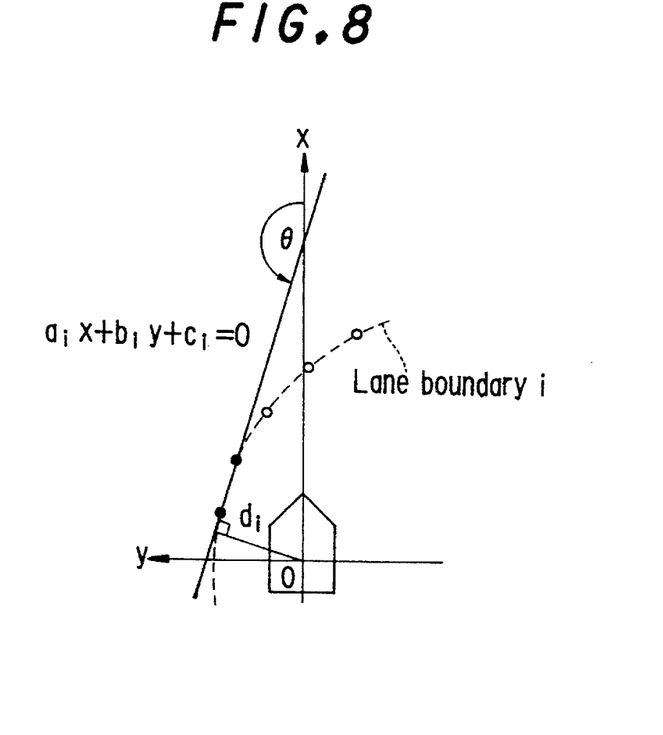
FIG. 8 is a diagram for explaining the procedure of the flowchart of FIG. 7 for measuring the distance between the vehicle and lane boundaries.

Next, the program proceeds to a step S124, via a step S122, in which the distance di from the vehicle to the each lane boundary i is measured. The method of this measurement is shown in FIG. 8. As shown, the distance di to a lane boundary i is defined as the length of a line drawn from the vehicle perpendicular to a straight line whose segment passing two sequence points of the lane boundary i. Since, as stated earlier, the coordinates of the points constituting the lane boundaries are expressed with respect to the vehicle as the origin, the distance from the vehicle to a straight line segment approximating a lane boundaries, namely the length di of a line drawn from the origin to the straight line segment approximating the lane boundary, can be readily determined. In order to determine the straight line segment, the portion of the sequence of points constituting the lane boundary i is applied to the linear equation $$aix + biy + ci = 0$$

Points within a region within around 30 m of the vehicle are used for this. In the case of two points, the foregoing equation gives a definitive result, while in the case of more than two points, it suffices to use the least squares method.

The coefficients are defined such that the sign of the coefficient ai is the same as the sign of sin θ, where θ is the angle between the line defined by the aforesaid equation and the x axis. When θ=0, i.e. when ai=0, the sign of bi is made the same as the sign of cos θ.

Next, the distance from the vehicle, namely from the origin, is calculated using the following equation.

$$di = ci / \sqrt{(ai^2 + bi^2)}$$

Figure 9:
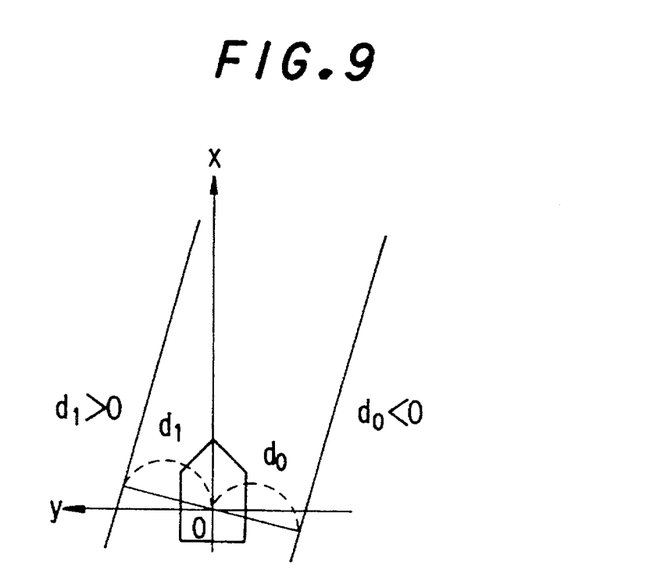
FIG. 9 is a diagram showing how algebraic signs are assigned in the procedures of FIG. 8.

The sign of di depends on its direction from the origin, as shown in FIG. 9. Since the axis of vehicle travel ordinarily lies approximately parallel to the lane boundaries, di can also be obtained by retrieving the abscissa at an appropriate position ahead from the sequence of points or by applying the aforesaid linear equation. As shown in FIG. 9, where the distances from the origin to the reference lane boundary 0 and to the next lane boundary 1 are defined as d0 and d1, respectively, the distance di from the reference lane boundary 0 to the lane boundary 1 concerned is obtained as d1−(−d0)=d1+d0.

The program then proceeds to a step S126 in which the distance d1+d0 between the reference lane boundary 0 and the lane boundary 1 concerned is divided by the width W of a single lane and the quotient is rounded to the nearest integer I. Next, in a step S128, the number obtained by adding the integer I obtained in the step S126 to the reference lane boundary number 0 is assigned as the number (this hereinafter referred to as "idi") of the lane boundary i concerned. If, for instance, the quotient is 2, the assigned number idi is 0+2=2. If the lane width W is known, the known value is used. Otherwise, the value obtained by the method of FIG. 8 is used.

Figure 7:
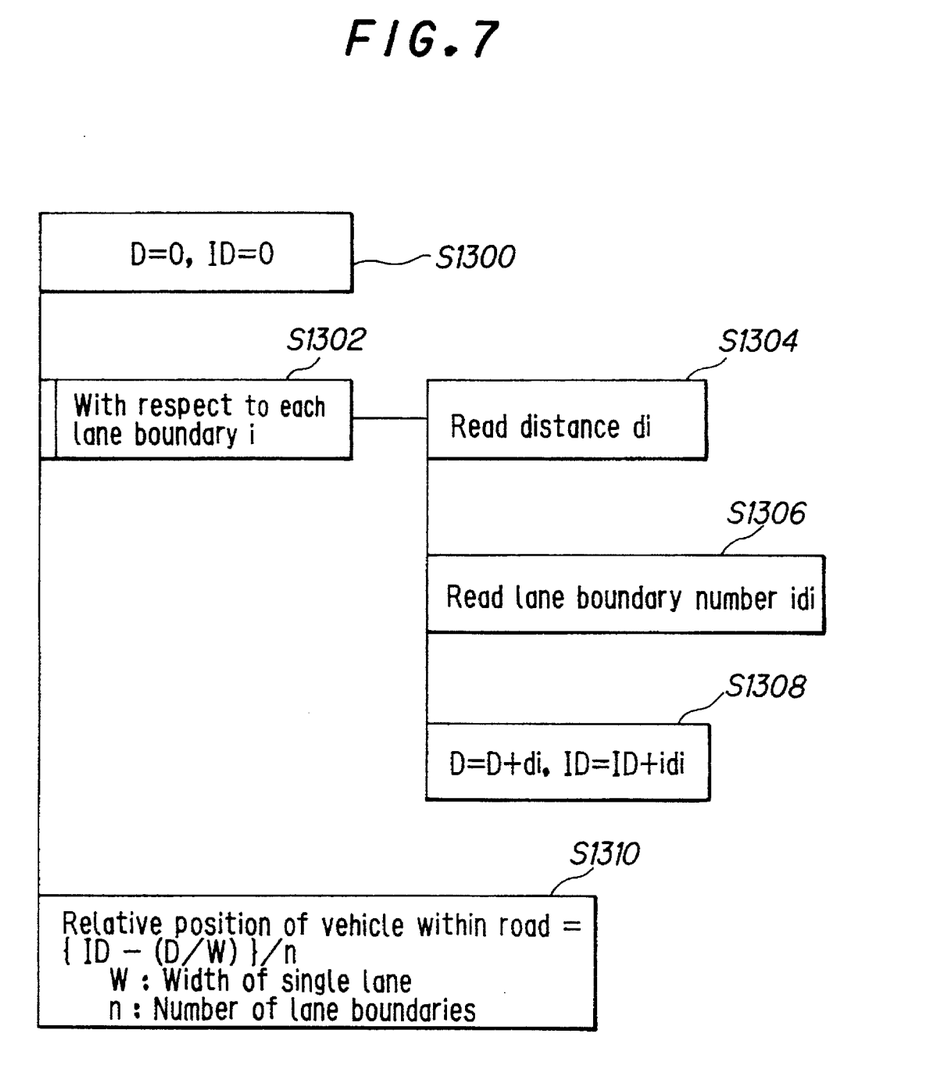
FIG. 7 is a flowchart of a subroutine of the flowchart of FIG. 6 for calculating the relative position of the vehicle within the road.

Since the distances di from the origin (vehicle) to the individual lane boundaries i and the lane boundary numbers idi will be used in steps S1304 and S1306 of the flowchart of FIG. 7 discussed later, they are stored in the prescribed memory.

The program then proceeds to a step S130 in which the relative position of the vehicle within the road (this position hereinafter referred to as "P") is calculated in accordance with the subroutine shown in FIG. 7. Before entering the explanation, the calculation will here be briefed. Namely, this is conducted by defining the width W of a single lane as a unit amount 1.0 (dimensionless number) and calculating the number of lane boundaries i from the reference lane boundary 0 using the multiple of unit amount, in other words, speaking in terms of coordinates, by calculating the y direction value as a real value and by converting it into a multiple of the unit amount. Since the vehicle normally travels near the middle of the lane, the result is a value such as 1.5 when the vehicle is in the second lane 1, for example.

More specifically, this is obtained by using the lane boundary numbers idi assigned in the step S128 to convert the vehicle-to-lane boundary distances di calculated in the step S124 into distances from the reference lane boundary 0 and averaging the results. The averaging is for reducing the effect of positional error in the point sequences constituting the extracted lane boundaries.

The subroutine for calculating the relative position P of the vehicle within the road shown in FIG. 7 will now be explained.

First, in a step S1300, the memory regions for storing the sum D of the distance di from the reference lane boundary 0 and the sum ID of the lane boundary idi are initialized to zero. The program then proceeds through a step S1302 to steps S1304 and S1306 in which the aforesaid distances di from the origin (vehicle) to the respective lane boundaries i and the lane boundary numbers idi are read from the prescribed memory. These values are then added to the respective sums D, ID in a step S1308. The program then proceeds to a step S1310 in which, based on the individual lane boundaries, the sum of the relative vehicle position P as seen from the reference lane boundary 0 is averaged in the manner as illustrated. The average value is, for instance, "1.5" as shown in FIG. 4. The averaging is likewise conducted for reducing the positional error in the point sequences constituting the extracted lane boundaries.

Returning to the flowchart of FIG. 6, the program proceeds to a step S132 where a judgment is made as to whether or not the current time is start time T0. Since the current time is T0 during the first cycle, the judgment is affirmative and the program of FIG. 6 is terminated.

Returning to FIG. 4, the program proceeds to a step S14 where the coordinates of the point sequences constituting the lane boundary, the assigned lane boundary numbers idi, the vehicle position P and the like are stored in the common memory 34 of FIG. 2, whereafter the program is terminated. As a result, the vehicle speed control CPU 60 is able to access the common memory 34 and conduct computations at all times. Moreover, the processing is simplified by the use of common lane boundary identifiers idi for all computers.

After starting again at time T1, the program of the flowchart of FIG. 4 proceeds through the step S10 to the step S12 to complete the processing up to the step S130. Assume that at this time, as shown on the left and right at the point where "Time T1" appears in FIG. 4, the recognized environment changes to one in which no rightmost lane is detected but, instead, a new lane boundary has been added on the left side. This will result in the rightmost lane boundary being treated as the reference lane boundary (0). In fact, however, this lane boundary (0) is physically continuous with the lane boundary (1) at start time T0. This situation can be assumed to have occurred because, for example, the detection at time T1 was delayed for some reason or other.

The program then proceeds to the step S132 of the flowchart of FIG. 6, where a judgment is made as to whether or not the current time is T0 and since the result is negative, the program proceeds through steps S134 to S140 for obtaining a value of the relative position within the road corrected in accordance with the vehicle locus. The corrected position will hereinafter be labeled "Q". More specifically, the program proceeds through the step S134 to the step S136 in which the coordinates of the point sequence which, among the point sequences constituting the lane boundaries in the preceding cycle, was used in the step S124 in the preceding cycle as the point sequence nearest the vehicle are corrected based on the vehicle locus.

This correction based on the locus is shown in FIG. 10. Since the vehicle has moved within the road between the start time T0 when the lane boundaries were successfully extracted in the preceding cycle and the time T1, more precisely T1+delay time, when they were successfully extracted in the current cycle, it is necessary to correct them to the same time before they can be compared. This correction is the task carried out here. More specifically, in this correction the amount of change in the constantly changing vehicle position and azimuth (estimated locus value) is used for the correction. In terms of coordinates this is a correction in the y direction.

Figure 11:
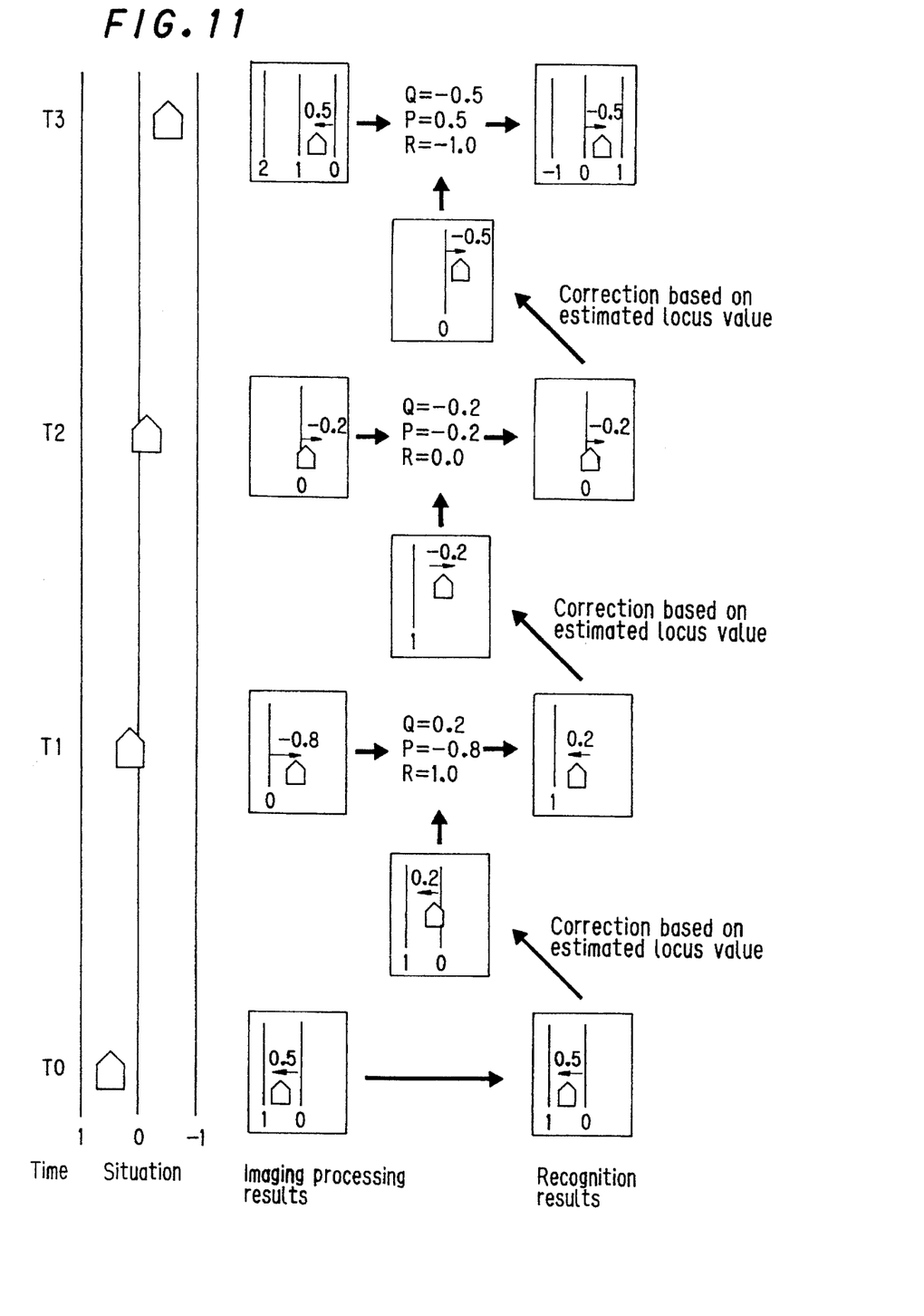
FIG. 11 is a diagram showing a specific example of vehicle position correction based on the vehicle locus.

This correction based on the vehicle locus can be conducted either by aligning the origin at time T1 with the origin at the start time T0 or vice versa. In the processing shown in FIG. 10 for correcting the relative position P of the vehicle within the road in the preceding cycle to that Q at the current time, the correction is carried out only with respect to the required ones of the point sequences constituting the lane boundaries extracted in the preceding cycle. FIG. 11 shows an example of the correction using the vehicle locus.

Next, the program proceeds to the step S138 in which the same subroutine as used in the step S124 is used to compute and store in memory the distances di between the vehicle and the lane boundaries i and then to the step S140 in which the aforesaid correction based on the vehicle locus is conducted. More specifically, this is conducted by calculating the relative position within the road in the same manner as in the step S130.

The program then proceeds to a step S142 in which the relative vehicle position in the current cycle (defined as P)

is subtracted from the relative vehicle position after correction (defined as Q) to obtain the difference R.

This will be explained with reference to an example. When, as shown in FIG. 4, the relative vehicle position P in the preceding cycle was 1.5, the value Q remains unchanged at 1.5 insofar as the vehicle advances parallel to the lane boundaries between time T0 and time T1 as expected, while the relative vehicle position P in the current cycle becomes 0.5. The value R is therefore 1.5–0.5=1. Here the program advances to a step S144 where R is added to the respective lane boundary numbers i. Thus, as shown in parentheses in FIG. 4, the lane boundary numbers are corrected from 0, 1, 2 to 1, 2, 3, enabling recognition of the continuity of the lane boundaries 1, 2 at time T0 in the preceding cycle. The program then proceeds to a step S146 in which R is added to the relative vehicle position P in the current cycle, correcting it in the manner of, for example, P=0.5+1=1.5. The program then returns to the step S14 of the flowchart of FIG. 4 where the corrected value is output to the common memory 34 and the program is terminated.

The foregoing also applies when a lane change occurring between time T0 and time T1 puts the vehicle in the position PLC shown in FIG. 4 at time T1. In this case, assuming that the relative vehicle position in the preceding cycle was 1.5, the corrected position Q based on the vehicle locus becomes 2.5 and the relative vehicle position P in the current cycle becomes 1.5. Therefore, R=2.5–1.5=1.0, whereby it is again possible to discriminate the continuity of the lane boundaries.

In the foregoing embodiment, the individual lane boundaries are identified, the same lane boundary is consistently assigned the same number, and the assigned numbers are stored in the common memory 34. Since the image processing CPU 36 and the other CPUs including those for vehicle steering control can therefore share the same input data, the time required for computation is shortened. In addition, lane boundary continuity can be easily discriminated even in the case where it has once been lost in the image owing to a delay in the detection.

While the aforesaid embodiment uses a monocular visual sensor, the invention also enables use of a binocular visual sensor. In this case, the front radars 12a can be eliminated.

The present invention has thus been shown and described with reference to specific embodiments. However, it should be noted that the present invention is in no way limited to the details of the described arrangements but changes and modifications may be made without departing from the scope of the appended claims.

What is claimed is:

1. A system for recognizing a lane boundary for use in a self navigating vehicle, comprising:

first means for capturing a view of a lane of a roadway on which said vehicle travels to obtain an image of said lane;

second means for extracting at least one line segment from said image;

third means for recognizing said lane at a first time and a second time based upon said at least one line segment;

fourth means for estimating a locus of said vehicle during a period between said first and second times;

fifth means for determining whether or not said lane recognized at said first time and said lane recognized at said second time are continuous and for assigning a same lane identifier when said lane recognized at said first time and said lane recognized at said second time are determined to be continuous; and sixth means for storing information regarding said lane identifier.

2. A system according to claim 1, wherein said fifth means includes:

seventh means for determining a first value indicative of a position of said vehicle with respect to said lane recognized at said first time and a second value indicative of a position of said vehicle based upon said locus of said vehicle; and wherein said fifth means compares said first and second values and, based on a result of that comparison, determines whether or not said lane recognized at said first time and said lane recognized at said second time are continuous.

3. A system according to claim 2, wherein said third means determines a boundary of said lane based on said at least one line segment to recognize said lane at said first time and at said second time and assigns a lane number to said lane boundary;

said seventh means determines said first and second values with respect to said lane boundary having an assigned number; and said fifth means obtains a difference between said first and second values and adds said difference to said assigned number to increment said assigned number and, by comparing a magnitude of said assigned number at said first time to a magnitude of said assigned number at said second time determine whether or not said lane recognized at said first time and said lane recognized at said second time are continuous.

4. A system according to claim 1, wherein said roadway has a plurality of lanes.

5. A system according to claim 1, wherein said vehicle is equipped with a steering control system which enables said vehicle to self-navigate along said lane, and said steering control system controls steering of said vehicle based on said stored information.

6. A system for recognizing a lane boundary for a self-navigating vehicle, comprising:

first means for capturing a view of a plurality of lanes of a roadway on which said vehicle travels to obtain an image of said plurality of lanes;

second means for extracting a plurality of line segments from said image to recognize a plurality of boundaries of said lanes at a first time T0 and a second time T1;

third means for assigning a reference number to one of said lane boundaries;

fourth means for determining a distance between said vehicle and each of said lane boundaries and dividing each said distance by a value corresponding to a width of each of said lanes to produce and assign a quotient value to each of said lane boundaries;

fifth means for determining a position of said vehicle relative to said lane boundary assigned said reference number at said first time T0 and said second time T1;

sixth means for estimating a locus of said vehicle during a period between said first time T0 and said second time T1 to provide a corrected position of said vehicle at said first time T0 and for obtaining a difference between said corrected position at said first time T0 and said position of said vehicle at said second time T1;

seventh means for adding said difference to said quotient value of each of said lane boundaries to produce an incremented quotient value for each of said lane boundaries and, by comparing said incremented quotient values with each other, to determine whether or not said lane boundaries recognized at said first time T0 and said lane boundaries recognized at said second time T1 are continuous, and assigning a same lane identifier when said lane boundaries recognized at said first time T0 and said lane boundaries recognized at said second time T1 are determined to be continuous; and eighth means for storing information concerning said lane identifier.

7. A system according to claim 6, wherein said vehicle is equipped with a steering control system which enables said vehicle to self-navigate along one of said plurality of lanes, and said steering control system controls steering of said vehicle based on said stored information.

8. A lane boundary recognition system for use in a vehicle navigation system, said boundary recognition system comprising:

a camera for generating an image of a roadway;

an image processing processor coupled to said camera for converting said image generated by said camera into a digital data set representing said image and storing said data set in a memory; and an image evaluation processor coupled to said memory, said image evaluation processor being programmed to:

extract at a first time T0 and a second time T1 a plurality of line segments each representing a lane boundary from said image of said roadway;

assign a lane boundary number to each of said line segments;

determine if any of said line segments extracted at said first time T0 and said line segments extracted at said second time T1 represent a continuous lane; and assign a same lane identifier to any of said line segments representing said continuous lane.

9. A method for use in an image evaluation processor of a vehicle self-navigation system, said method comprising the steps of:

extracting at a first time T0 and a second time T1 a plurality of line segments each representing a lane boundary from an image of a roadway;

assigning a lane boundary number to each of said line segments;

determining if any of said line segments extracted at said first time T0 and said line segments extracted at said second time T1 represent a continuous lane; and assigning a same lane identifier to any of said line segments representing said continuous lane.

* * * * *

UNITED STATES PATENT AND TRADEMARK OFFICE
CERTIFICATE OF CORRECTION

PATENT NO. : 5,517,412
DATED : May 14, 1996
INVENTOR(S) : Unoura, K.

It is certified that error appears in the above-indentified patent and that said Letters Patent is hereby corrected as shown below:

Column 8, line 28, after "second time" insert -- to --.

Signed and Sealed this

Tenth Day of March, 1998

Attest:

BRUCE LEHMAN

*Attesting Officer*  *Commissioner of Patents and Trademarks*